(12) United States Patent
George

(10) Patent No.: US 6,193,368 B1
(45) Date of Patent: Feb. 27, 2001

(54) MANUALLY ADJUSTABLE SPECTACLE TEMPLE

(75) Inventor: Byron George, 4821 Autumn Woods Dr., Jackson, MS (US) 39206

(73) Assignee: Byron George, Jackson, MS (US)

( * ) Notice: Subject to any disclaimer, the term of this patent is extended or adjusted under 35 U.S.C. 154(b) by 0 days.

(21) Appl. No.: 09/404,307

(22) Filed: Sep. 24, 1999

(51) Int. Cl.$^7$ .................................................. G02C 5/14
(52) U.S. Cl. ........................ 351/114; 351/111; 351/119; 351/123
(58) Field of Search .................................... 351/114, 121, 351/111, 118, 119, 122, 123, 41

(56) References Cited

U.S. PATENT DOCUMENTS

| | | |
|---|---|---|
| 1,498,249 | 6/1924 | Swanson . |
| 1,524,321 | 1/1925 | Stevens et al. . |
| 2,538,830 | 1/1951 | Collinson . |
| 3,796,482 * | 3/1974 | Blumenthal ........................... 351/114 |
| 3,993,403 | 11/1976 | Brown ................................... 351/178 |
| 4,074,932 | 2/1978 | Thill ...................................... 351/111 |
| 4,917,479 | 4/1990 | Bidgood ............................... 351/123 |
| 5,078,485 | 1/1992 | Aiba et al. ............................ 351/114 |
| 5,087,117 | 2/1992 | Steinwachs .......................... 351/117 |
| 5,258,784 * | 11/1993 | Baines .................................. 351/114 |

* cited by examiner

*Primary Examiner*—Hung Xuan Dang

(57) ABSTRACT

A spectacle temple has an arm coupled at one end to the lens portion of said spectacles and terminating in a hook at the opposite end, where the arm has a plurality of adjustable sections, each section having at least one ball in socket connection that is rotatable in any direction. The adjustable sections correspond to the temple area of a wearer's head, the top of the ear, and the curved portion of the ear. The rotatability of the ball and socket connections allow for a wearer to manually adjust the temples to achieve a proper fit. The hook end of the temple is covered by oil and encapsulated by a water-resistant rubber or plastic cover.

13 Claims, 1 Drawing Sheet

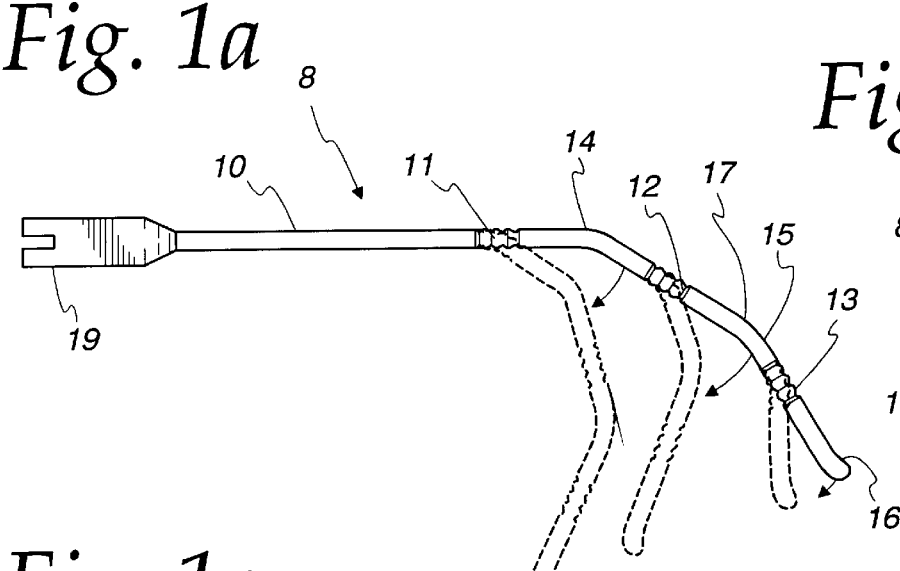
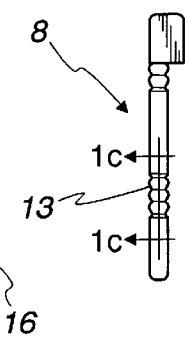
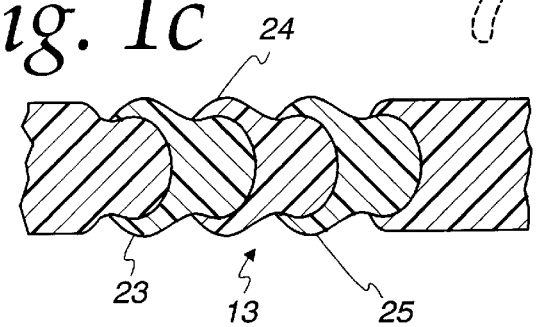
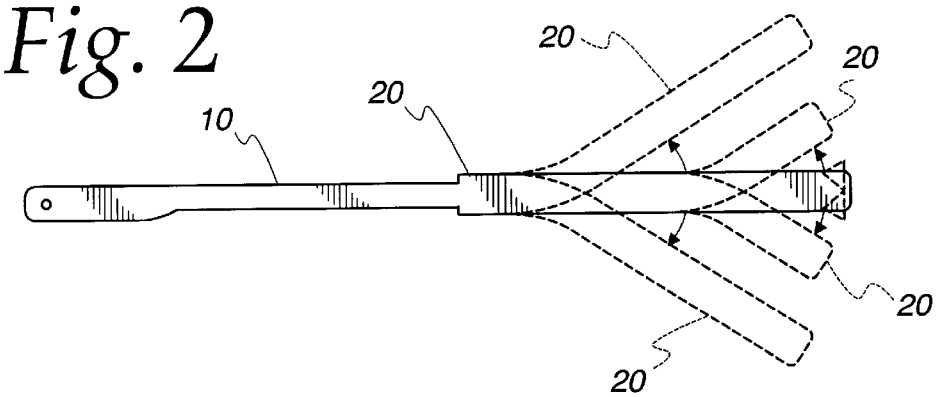
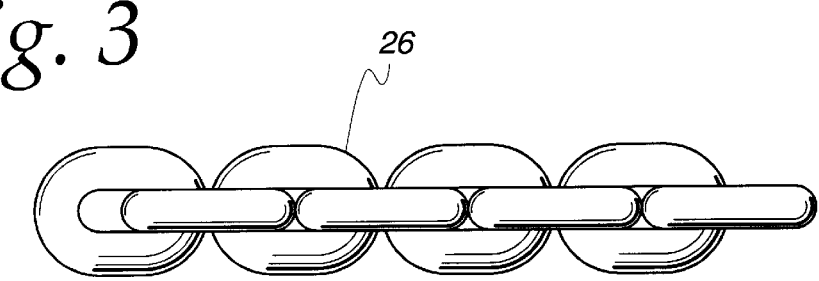

MANUALLY ADJUSTABLE SPECTACLE TEMPLE

BACKGROUND OF THE INVENTION

1. Field of the Invention

The present invention relates to spectacles. Particularly, the present invention relates to adjustable spectacle temples.

2. Description of the Prior Art

Many spectacle wearers visit optical stores or eye doctors regularly when their spectacles require adjustments of the temples. Typically, the temples, which defined broadly are the spectacle arms, are either too tight or loose on the wearer's face resulting in the spectacles causing pain and/or discomfort behind the ears, on the bridge of the nose or a general headache. Another common problem is where the temples are either too long or too short to form-fit behind the ears. In the art, the process for correcting either problem entails heating and manipulating the temple. However, the equipment for carrying out this process, along with the necessary expertise, are usually only available at the optical store or the doctor's office.

The manually-adjustable temple of the present invention alleviates the pain and discomfort associated with improperly fitted spectacles. Additionally, the manually-adjustable temples enables the spectacle wearer to manipulate and adjust the temples, without expert assistance, to achieve a constant perfect fit. This is accomplished by a temple comprising three sections having ball and socket type connections that are precision-fitted to rotate and adjust in various positions. The temples, and accordingly, the sections, are covered by oil and a water resistant jacket to allow the sections to maintain their rigidity and flexibility in spite of the friction between the ball and socket joints.

U.S. Pat. No. 3,649,106 to Hirschmann discloses a spectacle temple having two plastic sections that are mechanically interlocked to produce a sliding motion. Although the metal used in Hirschmann has extra-high elasticity and plasticity, heat and prolonged bending and twisting could effect the aforementioned properties of the metal and plastic.

In contrast, the present invention relies on more robust ball and socket type connections to provide enhanced flexibility and durability. The manually-adjustable temple of the present invention is covered with oil and a water-resistant rubber jacket. This adds needed comfort to the wearer as opposed to the often hard plastic covering found in temples known in the prior art. The precision fitted ball and socket connections are more reliable than the Hirschmann temples because they will not lose their rigidity after frequent adjustments. The three ball and socket connections address the temple, the top of the ear and the curved back portion of ear, all sensitive areas for spectacle wearers. Also, the multiple ball and socket type connections on the temple sections lessens the bending motion required for any particular joint, thereby by prolonging the life of each ball and socket connection.

U.S. Pat. No. 2,538,830 to Collinson discloses a temple for spectacle frames made of plastic. The ear-engaging portion of the temple is made relatively narrow, having a width not exceeding its thickness. This narrow portion is in the nature of a neck that joins the wide portions of the temple at either end. The narrow portion is equally inset from the two edges of the temple, the shoulders being rounded so that the edges of the narrow portion merge into those of adjacent portions. Between the shoulders, the edges are parallel affording a length of the temple for bending to adjust to individual wearers.

In contrast, the present invention has three adjustable temple sections as opposed to a narrowed section. This provides for a different type of adjustment. Additionally, the three adjustable sections of the present invention are covered with oil and a water resistant rubber jacket. The three sections, which are micro-machined ball and socket joints or connections, provide for increased flexibility as compared to the single narrowed section of Collinson.

U.S. Pat. No. 1,524,321 to Stevens et al. discloses a spectacle temple where flexibility is attained utilizing a flexible reinforcing rod. The rod is covered with a fabric, preferably in the form of a tube, that is slipped over the rod. The fabric is then enclosed in a non-metallic member for aesthetic reasons. The non-metallic member is bored to form a tube, whereby the rod may be extended through the bore to reinforce the fabric and the non-metallic member. The fabric and the reinforcing rod may be bent to the desired shape of the temple either before or after the non-metallic tube is applied.

In contrast, the present invention consist of three flexible sections, where each section consist of ball and socket-type joints. Each ball and socket connection is precision-fitted to provide flexibility but also sufficiently rigid to maintain proper temple positioning. Over time, the rod in the Stevens' temple will lose its rigidity due to adjustments that will be made. This is not true in the present invention where each ball and socket joint may be adjusted a significant number of times without any significant loss in rigidity. The ball and socket joints, in fact, will not lose their rigidity because the balls are designed to rotate in a socket for the purpose of adjustment. A rod, in contrast, whether metal or not, will lose rigidity and be unable to maintain a desired temple position over time.

U.S. Pat. No. 5,078,485 to Aiba et al discloses an eyeglass temple having an outer plastic cover and a metal core arm comprised of a metal having high elasticity such as Ni—Ti. Different properties are imparted to the metal core in the arm portion of the temple and the ear piece portion of the temple by applying different heat treatments to the metal core. According to the disclosure, the metal core has extra-high elasticity in the straight arm portion of the temple and plasticity in the curved ear piece, such that the ear piece can be freely bent to fit the shape and size of the wearer.

In contrast, the inner core of the present invention is an extra high elasticity metal having three sections, each section having machined ball and socket joints. The flexibility of the temple, therefore, is only partially dependent on the highly elastic nature of the metal and. Temple flexibility in the present invention is provided primarily by the ball and socket connections of the inner metal core. Predetermined bends in the metal core also enhance the customized fitting capability of the present invention. Also, as previously noted, the heating of and persistent bending and twisting of a temple such as that disclosed in Aiba will eventually effect the elasticity and plasticity properties of the metal and plastic.

U.S. Pat. No. 4,074,932 to Thill disclose temples made of a material which is substantially rigid at atmospheric temperatures but ductile at temperatures above atmospheric temperature, and a weighting material encapsulated in the material of which the temples are made which is substantially rigid at atmospheric temperatures but liquid at the temperature at which the temples are ductile. Thill also discloses a method of fitting eyeglasses having the aforementioned temples whereby the temples are heated until they are ductile and the weighting material is liquid, shaping the temples while they are ductile and the weighting material is liquid, and cooling the temples to solidify the weighting material and to make the material of the temples substantially rigid.

The present invention is designed especially to overcome the problems that Thill presents. First, the temples of the present invention do not require heating in order to be manipulated. The Thill temples are especially problematic in this regard because exact temperatures must be achieved to liquefy the encapsulated weighted material to make the temples ductile and subsequently to cool the weighted material and to make the temples rigid. The present invention eliminates any need for heating and cooling the temples. Moreover, the present invention eliminates the need for any special equipment required for the heating and cooling processes. The temples of the present invention can be manipulated by the wearer to achieve a desired fit without requiring a trip to the optical store or doctor. Finally, over time, the heating and cooling processes may effect the properties of the Thill temple. There is no such concern in the present invention.

U.S. Pat. No. 4,917,479 to Bidgood discloses a temple consisting of either a single continuous piece terminating in a thin tempering hook member fitted with a moveable semi-soft weighted sleeve, or with temple pieces consisting of two segments, a forward section connected by the usual hinged means to the frame holding the lenses, and a rearward section terminating in a solid hooked member made of heavy material and with a soft cushion attached underneath. The segments are connected by means of a sleeve that permits horizontal adjustment. The function of these configurations, according to the disclosure, is to eliminate or reduce soreness and the feeling of increased weight at the ears, ease of adjustment and a means of keeping the lenses in a proper position for maximum effectiveness.

The present invention, in contrast, achieves ease of adjustment and proper lens positioning utilizing the three sections having ball and socket type connections that may be easily adjusted by the wearer. Excessive pressure over the ears is not a problem in the present invention because the ball and socket connections ensure that the wearer will be able to properly fit the spectacles on the bridge of the nose. Accordingly, the present invention eliminates the need for counterweights on the ears.

U.S. Pat. No. 1,498,249 to Swanson discloses a spectacle temple where an insertable rod is first rendered flexible prior to insertion into an outer temple tube. The forward portion of the rod, which will reside closest to the lens, is endowed with flexibility by flattening it such that it will be rendered flexible in a direction transverse to the plane of the flattened portion. In this case the flexible directions are toward and away from the face of the wearer. The forward portion of the outer temple tube is also flattened for enhanced flexibility.

The present invention, in contrast, achieves improved temple flexibility using the three sections having ball and socket type connections. Unlike the flattened sections in Swanson, the ball and socket connections of the present invention will not become less rigid after undergoing frequent adjustment. Also, the ball and socket connections provide for adjustment by the user in the vertical as well as horizontal directions. Accordingly, the wearer may adjust the temple arms up and down along the side of the wearer's face, as well as toward and away from the face.

U.S. Pat. No. 3,993,403 to Brown discloses removable insulated sheaths employed on heat-softened temples of eyeglasses during fitting of the glasses to the head of the wearer to prevent injury or discomfort to the wearer. The temples are allowed to cool and harden while held in position on the head.

In contrast, the temples of the present invention do not require heating and cooling to achieve a desired fit. The present invention utilizes three ball and socket sections on the temple that a wearer may easily adjust. Accordingly, no trips to an optical store are necessary. Furthermore, the water resistant rubber or plastic jacket that covers the temples helps alleviate discomfort in the temple area and is flexible enough to adjust in conjunction with the ball and socket connections without the need for heating and cooling.

U.S. Pat. No. 5,087,117 to Steinwachs discloses a side member of a spectacles frame comprising an elongated rod and a wider ear part extending rearwardly from the rod. The ear part comprises at least two spars being substantially parallel in spaced relationship to form an opening therebetween. The ear part can be adjusted when heated, providing the wearer with the comfort associated with a wide part. The two spaced apart spars distribute the pressure force applied by the spectacle to the head of the wearer in a manner such that the user senses it as distribution over a wide surface. Because the cross sectional area of the two spars is relatively small, it is alleged that the end of the ear piece may be easily deformed in any direction.

In contrast, the temple of the present invention does not rely on two narrow spars for its flexibility, but instead on three sections having ball and socket type connections. It is possible that over time and as a result of frequent adjustment, the Steinwachs' temples will lose the necessary rigidity to maintain proper form. This is especially likely since the two spars have narrow cross sectional areas. The present invention, whose ball and socket connections are covered in oil arc designed for continual adjustment, will suffer no similar loss in rigidity over time.

SUMMARY OF THE INVENTION

The object of the present invention is to eliminate the aforementioned disadvantages of the prior art while retaining all the advantages of lightweight, stylish temples. Particularly, the temples are provided with adjustable sections which can be manually formed by a wearer. Heating and cooling of the temples, as commonly required in the prior art, is not required to adjust the temples of the present invention. Accordingly, it is not necessary for a wearer to visit an optical store or doctor for periodic adjustments.

In one aspect of the present invention the above objectives are achieved in a temple comprising an arm core having at least one adjustable section, where the adjustable sections each have at least one ball-in-socket type connection.

In another aspect, the ball and socket connections are rotatable in any direction.

In another aspect, the temple of the present invention comprises an arm core having adjustable sections where each adjustable section is positioned in proximity to the temple area of the wearer's head, the top of the ear, and the curved portion of the ear, all sensitive areas for spectacle wearers.

In still another aspect of the present invention the temple is comprised of extra-high elasticity metal.

In yet another aspect of the present invention the temple is covered with oil and a water resistant rubber or plastic jacket.

These and other aspects and advantages of the details of the construction will become apparent after reading the

BRIEF DESCRIPTION OF THE DRAWINGS

FIG. 1(a) is a temple of a pair of spectacles having adjustable sections that may be manually adjusted by a wearer according to the present invention.

FIG. 1(b) is a front elevation of the temple in FIG. 1(a).

FIG. 1(c) is an enlarged cross-sectional view along line A—A of the adjustable section shown in FIG. 1(b) showing ball and socket connections that comprise the adjustable section according to a preferred embodiment of the invention.

FIG. 2 is a top elevation of the temple in FIG. 1(a) that also includes a rubber or plastic cover over the ear piece portion of the temple.

FIG. 3 is a chain link connection that may be substituted for the ball and socket connections of FIG. 1(c) according to an alternative embodiment of the invention

DESCRIPTION OF THE PREFERRED EMBODIMENTS

Referring to FIG. 1(a), the temple 8 of the present invention has an arm core 10 that is adjustable and is composed of metals having extra-high elasticity such as Ni—Ti and Cu—Zn—Al alloys. The arm core 10 couples at a lens-end 19 to a lens of a pair of spectacles, and terminates at the opposite-end 16 in a hook for fitting over and around the ear of a wearer. Of course other metals, including but not limited to Flexon™ (Ni—Al), beryllium, chrome, monel, nickel-silver, spring-bronze and stainless steel, could be substituted in an alloy or possibly used alone without departing from the scope of the present invention. The primary requirement being that the metal or the percentage composition of metals in an alloy used to form the arm core 10 allow for the formation of precision-fitted ball and socket connections 23, 24 and 25 (FIG. 1(c)) that make up sections 11, 12 and 13. Although three adjustable sections 11, 12 and 13 are shown in the preferred embodiment it is contemplated that a different number of adjustable sections, more or less, may be implemented without departing from the scope of the invention. Temple 8 has bend sections 14 and 15 that are bent to a predetermined degree to improve the fit of the temple on the wearer's nose (bridge), cars and head.

FIG. 1(b) is a front elevation of the temple 8 in FIG. 1(a) that includes a frontal view of adjustable section 13. As can be seen more clearly in FIG. 1(c), which is an enlarged cross-sectional view along line A—A of adjustable section 13 in FIG. 1(b), adjustable section 13 is comprised of several ball and socket connections 23, 24 and 25. The number of ball and socket connections required in each adjustable section depends on several factors, including but not limited to, desired flexibility, desired fit on the wearer's temple, desired fit on the top of the ear, desired fit on the curved portion of the ear, the size of each ball and socket connection, the degree of the precision fit between each ball and socket, and the material properties of the alloy or metal used to create the arm core 10.

Each ball and socket connection 23, 24 and 25 can adjust vertically up and down along the wearer's face and horizontally away from and toward the wearer's face. The vertical adjustment allows the temple 8 of the present invention to relieve excessive pressure on the bridge of the nose or the ear, or to allocate more pressure on the bridge of the nose or on the ear when necessary. The horizontal adjustment away from the face allows for relief of excessive pressure on the side of the head or to allocate more pressure on the side of the head when necessary.

Different wearers, of course, will have different sensitivity levels with respect to the bridge of the nose, side of the face and head, top of the ear and back of the ear. Accordingly, the three adjustable sections 11, 12 and 13 are independently adjustable to achieve the desired fit. It should also be noted that adjustment in one direction of one adjustable section may alter the fit of the spectacles on the wearer with respect to another adjustable section. For example, adjusting the adjustable section 11 vertically upward to relieve pressure on the nose may have the concomitant effect of increasing pressure on the top and/or back of the ear. The adjustable sections 12 and 13 can be adjusted to counterbalance any increased pressure on the ear. The ability to counter any negative affect caused by adjusting one adjustable section is directly proportional to the number of ball and socket connections in the remaining adjustable sections. If there are a significant number of ball and socket type connections in a given counterbalancing adjustable section, for instance, then only a small percentage of the total number of connections will be necessary to counterbalance the unwanted impact caused by adjusting an independent adjustable section. The smaller the percentage of connections required to counterbalance the adjustment of another adjustable section means less of an impact on the counterbalancing adjustable section. Consequently, having a significant number of connections will allow for enhanced fine-tuning of the spectacle fit by the wearer. Additionally, the location of the adjustable sections 11, 12 and 13 on the arm core 10 will impact the fit of the spectacles. For example, adjustable section 11 could be located further away from the ear piece portion 17 and closer to the lens-end 19 of the temple 8.

FIG. 2 is a top elevation of the eyeglass temple in FIG. 1(a), but also includes a water-resistant rubber or plastic cover 20 over the ear piece portion 17 (FIG. 1(c)). The cover 20 provides a comfortable cushion for the ear which is typically a very sensitive area for the wearer. The cover 20 is seated over the ear piece portion 17 of the arm core 10. In the preferred embodiment, an oil based substance covers the arm core 10 and is encapsulated by the cover 20 such that the ball and socket connections 23, 24 and 25 (FIG. 1(c)) of the adjustable sections 11, 12 and 13 are continually lubricated. The ball and socket connections 23, 24 and 25 when lubricated will have a longer useful life. Additionally, continual lubrication will allow for a tighter fit between the ball and socket of each connection 23, 24 and 25 without a significant reduction in useful life caused by the friction between the ball and socket. FIG. 2 also illustrates the bending action of the temple 8 to demonstrate that the cover 20 must be suitably flexible to adjust and deform with the arm core 10. The precision fit of the ball and socket connections 23, 24 and 25 ((FIG. 1(c)) of adjustable sections 11, 12 and 13 ((FIG. 1(a)) must be sufficient to counterbalance the tendency, if any, of the cover 20 to revert back to its original form after being deformed. Otherwise, the wearer will remain in a continual state of adjustment.

It will of course be understood that the embodiments of the invention herein presented are by way of illustration only, and are meant to be in no way limiting. For example, a chain link connection 26 such as is typically found on an ordinary bicycle chain or as illustrated in FIG. 3 could be substituted for the ball and socket connections 23, 24 and 25 shown in FIG. 1(c) without departing from the scope of the present invention. Additionally, numerous other modifications and changes may be made, and the full use of equivalents resorted to, without departing from the scope of the invention as defined by the appended claims.

What is claimed is:

1. A temple (8) of a pair of spectacles, comprising:

an arm core (10) having a lens-end (19) and an opposite-end (16) that terminates in a hook;

said arm core (10) having at least one adjustable section (11, 12, 13); and said at least one adjustable section (11, 12, 13) of said arm core (10) having at least one ball-in-socket connection (23, 24, 25), and said at least one adjustable section (11, 12, 13) of said arm core (10) is covered with oil and a water resistant jacket (20).

2. The temple (8) of claim 1, wherein said arm core (10) is comprised of extra-high elasticity metal.

3. The temple (8) of claim 1, wherein said arm core (10) is comprised of plastic.

4. The temple (8) of claim 1, wherein said arm core (10) is comprised of titanium.

5. The temple (8) of claim 1, wherein said at least one adjustable section (11, 12, 13) of said arm core (10) has a plurality of ball-in-socket connections (23, 24, 25).

6. The temple (8) of claim 1, wherein said temple has at least one bend section (14, 15).

7. A temple (8) of a pair of spectacles, comprising:

an arm core (10) having a lens-end (19) and an opposite-end (16) that terminates in a hook; and said arm core (10) having a plurality of adjustable sections (11, 12, 13); and each of said plurality of adjustable sections (11, 12, 13) of said arm core (10) having at least one ball-in-socket connection (23, 24, 25), and said arm core (10) having at least one bend section (14, 15) positioned between any two of said plurality of adjustable sections (11, 12, 13) and said plurality of adjustable sections (11, 12, 13) of said arm core (10) being covered with oil and a water resistant jacket (20).

8. The temple (8) of claim 7, wherein said plurality of adjustable sections (11, 12, 13) are positioned on a wearer's head in proximity to the temple, the top of the ear, and the curved portion of the ear.

9. A temple (8) of a pair of spectacles, comprising:

an arm core (10) having a lens-end (19) and an opposite-end (16) that terminates in a hook;

said arm core (10) having at least one adjustable section (11, 12,13); and said at least one adjustable section (11, 12, 13) of said arm core (10) having a chain link section (26), and said at least one adjustable section (11, 12, 13) of said arm core (10) is covered with oil and a water resistent jacket (20).

10. The temple (8) of claim 9, wherein said arm core (10) is comprised of extra-high elasticity metal.

11. The temple (8) of claim 9, wherein said arm core (10) is comprised of plastic.

12. The temple (8) of claim 9, wherein said arm core (10) is comprised of titanium.

13. The temple (8) of claim 9, wherein said temple has at least one bend section (14, 15).

* * * * *